(12) United States Patent
Take et al.

(10) Patent No.: US 7,167,439 B2
(45) Date of Patent: Jan. 23, 2007

(54) MULTILEVEL OPTICAL RECORDING MEDIUM WITH CALIBRATION SIGNALS

(75) Inventors: Hiroshi Take, Tokyo (JP); Hiroyuki Arioka, Tokyo (JP); Narutoshi Fukuzawa, Tokyo (JP); Shuji Tsukamoto, Tokyo (JP); Takashi Horai, Tokyo (JP); Motohiro Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 328 days.

(21) Appl. No.: 10/496,336

(22) PCT Filed: Dec. 4, 2002

(86) PCT No.: PCT/JP02/12732

§ 371 (c)(1),
(2), (4) Date: May 21, 2004

(87) PCT Pub. No.: WO03/050805

PCT Pub. Date: Jun. 19, 2003

(65) Prior Publication Data

US 2005/0013234 A1 Jan. 20, 2005

(30) Foreign Application Priority Data

Dec. 11, 2001 (JP) .............................. 2001-376555

(51) Int. Cl.
*G11B 7/24* (2006.01)
(52) U.S. Cl. .................................. 369/275.4; 369/288
(58) Field of Classification Search ...................... None
See application file for complete search history.

(56) References Cited

U.S. PATENT DOCUMENTS

| | | | | |
|---|---|---|---|---|
| 6,611,484 | B1 * | 8/2003 | Tsukamoto | ............... 369/59.11 |
| 6,699,557 | B1 * | 3/2004 | Arioka et al. | ............... 428/64.4 |
| 6,754,166 | B1 * | 6/2004 | Arioka et al. | ............. 369/275.1 |
| 6,808,778 | B1 * | 10/2004 | Arioka et al. | ............... 428/64.1 |
| 6,914,875 | B1 * | 7/2005 | Arioka | ..................... 369/275.4 |

(Continued)

FOREIGN PATENT DOCUMENTS

EP    1 174 863 A2    1/2002

(Continued)

*Primary Examiner*—Paul Huber
(74) *Attorney, Agent, or Firm*—Seed IP Law Group PLLC

(57) ABSTRACT

It is an object of the present invention to provide a multilevel optical recording medium in which influence of variation in characteristics of a recording layer in a plane of the recording layer on reproduced data can be corrected The multilevel optical recording medium according to the present invention includes at least a recording layer 12 and is constituted so that data can be recorded therein in a multilevel manner by controlling a state of the recording layer 12 among multiple stages and the multilevel optical recording medium according to the present invention is characterized in that a plurality of calibration signals are stored in the recording layer 12. According to the thus constituted multilevel optical recording medium, since an optical data recording and reproducing apparatus can detect and correct for the variation in characteristics of the recording layer 12 in the plane thereof, even in the case where variation in characteristics of the recording layer 12 in the plane thereof is present, data recorded in the multilevel optical recording medium in a multilevel manner can be read in a desired manner.

6 Claims, 6 Drawing Sheets

U.S. PATENT DOCUMENTS

| | | | |
|---|---|---|---|
| 6,956,804 B1 * | 10/2005 | Tsukamoto | 369/59.11 |
| 6,986,150 B1 * | 1/2006 | Spruit et al. | 720/718 |
| 7,012,870 B1 * | 3/2006 | Tsukamoto | 369/59.11 |
| 7,042,824 B1 * | 5/2006 | Tsukamoto | 369/59.22 |

FOREIGN PATENT DOCUMENTS

| | | |
|---|---|---|
| JP | 2001-184647 A | 7/2001 |
| JP | 2001-184648 A | 7/2001 |
| JP | 2001-184649 A | 7/2001 |
| JP | 2002-025114 A | 1/2002 |
| JP | 2002-083424 A | 3/2002 |
| JP | 2002-083425 A | 3/2002 |
| JP | 2002-083426 A | 3/2002 |
| JP | 2002-083427 A | 3/2002 |
| JP | 2002-083445 A | 3/2002 |
| JP | 2002-083446 A | 3/2002 |
| JP | 2002-150562 A | 5/2002 |
| JP | 2002-304725 A | 10/2002 |
| JP | 2002-304726 A | 10/2002 |
| JP | 2002-304727 A | 10/2002 |
| JP | 2002-304728 A | 10/2002 |
| JP | 2002-304768 A | 10/2002 |
| JP | 2002-312937 A | 10/2002 |
| WO | WO 00/25308 | 5/2000 |
| WO | WO 01/27917 A1 | 4/2001 |

* cited by examiner

MULTILEVEL OPTICAL RECORDING MEDIUM WITH CALIBRATION SIGNALS

FIELD OF THE INVENTION

The present invention relates to a multilevel recording medium.

This application is a 371 of PCT/JP02/12732, filed Dec. 4, 2002.

DESCRIPTION OF THE PRIOR ART

Optical recording media typified by the CD and the DVD have been widely used as recording media for recording digital data, and a widely used data recording format is a format wherein the lengths of pits along the track are modulated depending on the data to be recorded.

In this recording format, when data are to be reproduced, a laser beam set to a reproducing power is projected onto the optical recording medium along the tracks thereof and light reflected from the optical recording medium is detected, thereby judging whether or not a pit is present on the reflection surface. On the other hand, when data are to be recorded, a laser beam set to a recording power is projected onto the optical recording medium along the tracks thereof, whereby a pit of a predetermined length is formed.

In recent years, it has become strongly desirable to achieve further increases in the density of data and in order to achieve this, a so-called "multilevel recording format" has been proposed. Unlike the above mentioned recording format, in the multilevel recording format, one of a plurality of recording marks each with different meanings is assigned to a virtual recording cell. When data are to be reproduced, a laser beam set to a reproducing power is projected onto the optical recording medium along the tracks thereof and light reflected from the optical recording medium is detected, thereby judging the kind of recording mark assigned to each of the virtual recording cells. On the other hand, when data are to be recorded, a laser beam set to a recording power is projected onto the optical recording medium along the tracks thereof, whereby a recording mark to be assigned to each of the virtual recording cells is recorded in the virtual recording cell.

The virtual recording cells to which different recording marks are assigned have different light transmittances with respect to a laser beam. Specifically, when data are to be recorded, the amount of a laser beam set to a recording power projected onto each of the virtual recording cells is controlled in a multilevel manner, whereby the light transmittance of each of the virtual recording cells is determined in a multilevel manner.

Here, the "light transmittance" means the ratio of the amount of a laser beam passing through a virtual recording cell to the amount of the laser beam projected onto the virtual recording cell when data are to be reproduced. Therefore, when data are to be reproduced, a laser beam projected onto a virtual recording cell passes through the virtual recording cell, is reflected by a reflective layer, again passes through the virtual recording cell and is emitted from the multilevel recording medium to the outside and the intensity of the thus emitted laser beam is detected, thereby judging the kind of a recording mark assigned to the virtual recording cell.

As apparent from the above, in order to record data in the multilevel recording medium with higher density, it is effective to control the reflection coefficients of the virtual recording cells among more stages. For example, if the reflection coefficients of the virtual recording cells are controlled among four stages, information recorded in each of the virtual recording cells is expressed by two bits, while if the reflection coefficients of the virtual recording cells are controlled among eight stages, information recorded in each of the virtual recording cells is expressed by three bits. In order to enable the reflection coefficients of the virtual recording cells to be controlled among more stages, it is necessary for the difference between the reflection coefficient of a virtual recording cell to which a recording mark having the highest light transmittance is assigned and the reflection coefficient of a virtual recording cell to which a recording mark having the lowest light transmittance is assigned, namely, the dynamic range, to be considerably large. Therefore, a recording layer which can ensure a considerably wide dynamic range is selected as the recording layer of the multilevel recording medium. For this purpose, an organic dye recording layer or a phase change type recording layer is selected as the recording layer of the multilevel recording medium and is formed using a spin coating process or a sputtering process.

The spin coating process is used as a process for applying a coating material in a liquid form not only in the field of manufacturing optical recording media but also in the field of manufacturing semiconductor devices and the like. However, when a film is formed using the spin coating process, although the thickness of the film can be made substantially uniform at regions spaced a distance outward from the point at which the coating solution is dropped (the dropping point), it tends in the vicinity of the dropping point to thin rapidly with increasing proximity to the dropping point. Therefore, the characteristics of the recording layer inevitably vary depending upon the planar positions in the recording layer.

On the other hand, the sputtering process is generally used for forming inorganic material films, including the recording layer of an optical recording medium, but the distribution of film thickness varies depending upon the planar positions in the radial direction or circumferential direction of a disk-like optical recording medium because of the structure of the sputtering device, the influence of sputtering target consumption (erosion) as the sputtering process progresses, and the like.

It is possible to reduce such variation in thickness of the recording layer in the plane thereof to some extent by improving the manufacturing equipment and/or the manufacturing process. However, even though variation in thickness of the recording layer may not be a serious problem in the recording format used for the CD and the DVD wherein the lengths of pits along the track are modulated depending on the data to be recorded, even a small variation in thickness of the recording layer makes it difficult to reproduce data recorded in the multilevel recording medium because it is necessary to control the reflection coefficients of the virtual recording cells in a multilevel manner. In particular, in the case where an organic dye recording layer is used as the recording layer, since the recording layer is formed using the spin coating process and the variation in thickness of the recording layer in the plane thereof is large, it is necessary for the data reproducing apparatus to detect and correct the influence of the variation in thickness of the recording layer in the plane thereof on reproduced data in order to reproduce data recorded therein in a desired manner.

SUMMARY OF THE INVENTION

It is therefore an object of the present invention to provide a multilevel recording medium in which influence of variation in characteristics of a recording layer in a plane of the recording layer on reproduced data can be corrected.

The above object of the present invention can be accomplished by a multilevel recording medium which comprises at least a recording layer and in which data can be recorded in a multilevel manner by controlling a state of the recording layer among multiple stages, a plurality of calibration signals being stored in the recording layer.

According to the present invention, since a plurality of calibration signals are stored in the recording layer, a data reproducing apparatus can detect the variation in thickness of the recording layer in the plane thereof and correct it. Therefore, even in the case where variation in thickness of the recording layer in the plane thereof is present, data recorded in the recording layer in a multilevel manner can be reproduced in a desired manner.

In a further preferred aspect of the present invention, the calibration signals include at least a first virtual recording cell sequence in which a plurality of virtual recording cells each recorded with first information are formed and a second virtual recording cell sequence in which a plurality of virtual recording cells each recorded with second information different from the first information are formed.

In a further preferred aspect of the present invention, the first information is information corresponding to a virtual recording cell having the highest reflection coefficient and the second information is information corresponding to a virtual recording cell having the lowest reflection coefficient.

In a preferred aspect of the present invention, the recording layer is formed of a dye.

In a further preferred aspect of the present invention, the recording layer is formed using a spin coating process.

In a further preferred aspect of the present invention, density of calibration signals stored at an inner circumferential portion is higher than that of calibration signals stored at an outer circumferential portion.

According to this preferred aspect of the present invention, it is possible to further improve the accuracy of reading data and to ensure a larger region usable by a user.

In another preferred aspect of the present invention, the recording layer is formed of a phase change material.

In another preferred aspect of the present invention, the recording layer is formed using a sputtering process.

DESCRIPTION OF THE PREFERRED EMBODIMENTS

Preferred embodiments of the present invention will be explained in detail with reference to the drawings.

Figure 1:
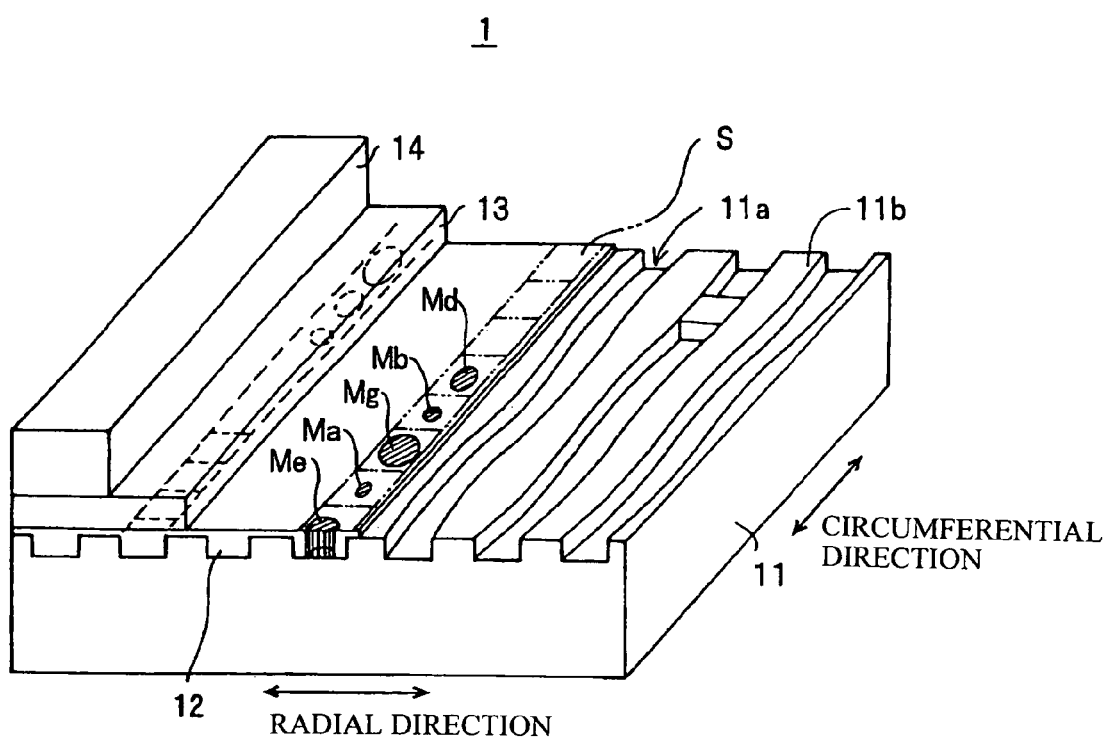
FIG. 1 is a schematic partially cutaway perspective view showing the configuration of a multilevel optical recording medium 1.

FIG. 1 is a schematic partially cutaway perspective view showing configuration of a multilevel optical recording medium 1 (hereinafter sometimes referred to as "optical recording medium 1").

In this embodiment, the optical recording medium 1 is constituted as a CD-R type optical recording medium (a write-once type optical recording medium). As shown in FIG. 1, the optical recording medium 1 includes a substrate 11, a recording layer 12, a reflective layer 13 and a protective layer 14. The substrate 11 is disc-like and formed of a transparent resin. Grooves 11a and lands 11b for guiding a laser beam are spirally formed on one of the surfaces of the substrate 11 (the upper surface thereof in FIG. 1) so as to extend from a portion in the vicinity of the center of the substrate 11 toward the outer circumference thereof. The recording layer 12 is formed of an organic dye such as cyanine dye, merocyanine dye, methine system dye, derivatives thereof, benzenethiol metal complex, phthalocyanine dye, naphthalocyanine dye, azo dye or the like and the grooves 11a and the lands 11b are covered with the organic dye applied thereonto. When a laser beam set to a recording power by an optical data recording and reproducing apparatus is projected onto the recording layer 12, the recording layer 12 is decomposed and degraded and light transmittance thereof is changed in accordance with the amount of the laser beam projected thereonto. Since the recording layer 12 is formed of the organic dye, it is formed using a spin coating process. The reflective layer 13 is a thin layer for reflecting the laser beam passing through the substrate 11 and the recording layer 12 when data recorded in the optical recording medium 1 are to be reproduced. It is formed by sputtering a material containing metal such as Au, Ag or the like on the recording layer 12, for example. The protective layer 14 serves to protect the reflective layer 13 and the recording layer 12 and is formed so as to cover the outer surface of the reflective layer 13.

However, the optical recording medium according to the present invention is not limited to the above mentioned CD-R type optical recording medium (write-once type optical recording medium) and may be a CD-W type optical recording medium (data rewritable type optical recording medium) in which a phase change material is used for a recording layer. In this case, it is necessary to form a lower protective layer (dielectric layer) between the recording layer and the reflective layer and an upper protective layer (dielectric layer) between the recording layer and the substrate. The recording layer, the lower protective layer and the upper protective layer can be formed using a sputtering process. A GeSbTe material or an AgInSb material may be used as a phase change material for forming the recording layer.

Next, the principle of recording data in the optical recording medium 1 will be explained below with reference to a drawing.

As shown in FIG. 1, in the optical recording medium 1, virtual recording cells S, S, . . . , each of which constitutes a recording unit, are defined by virtually dividing the grooves 11a along the rotation direction (circumferential direction) of the optical recording medium 1.

Figure 2:
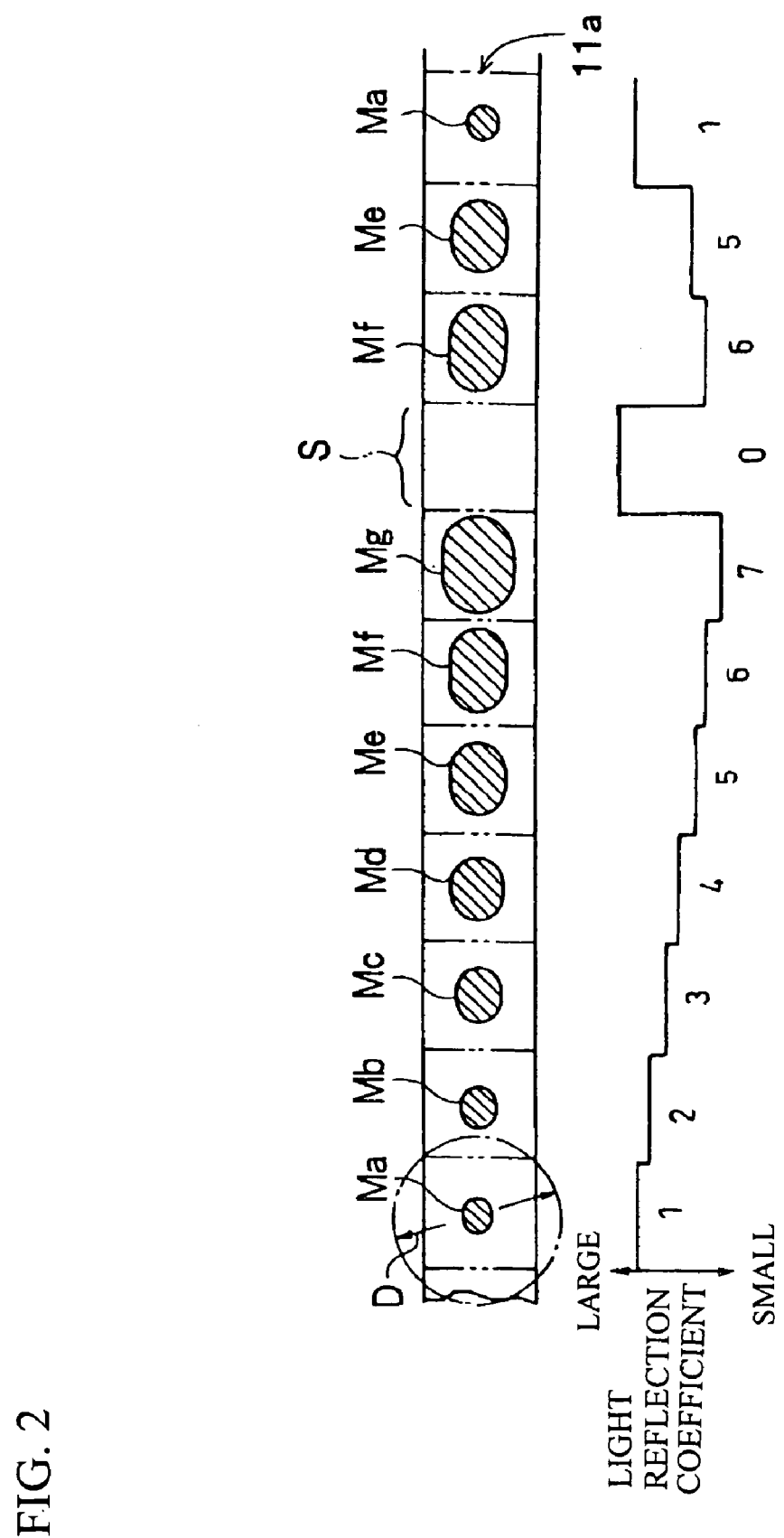
FIG. 2 is a diagram schematically showing recording marks Ma to Mg recorded in an optical recording medium 1.

FIG. 2 is a diagram schematically showing recording marks Ma to Mg recorded in the optical recording medium 1. As shown in FIG. 2, the length of each of the virtual recording cells S along the grooves 11a is determined to be shorter than the diameter D of a condensed beam (diameter of the beam waist). Each of the virtual recording cells S is only an assumed virtual cell on the side of the optical data recording and reproducing apparatus and no boundaries for defining the individual virtual recording cells are present in the optical recording medium 1.

As shown in FIG. 2, recording marks Ma to Mg (hereinafter sometimes referred to as "recording marks M" when the recording marks are not distinguished from each other) in which the degrees of decomposition and degradation of the recording layer 12 (mainly, the organic dye) are different from each other are formed in the virtual recording cells S by controlling the time period during which a laser beam is emitted from a pick up of the optical data recording and reproducing apparatus when data are to be recorded in the recording layer 12, namely, the amount of the laser beam projected onto the recording layer 12, in a multilevel manner in accordance with values of data to be recorded. Here, in FIG. 2, the degrees of decomposition and degradation of the recording layer 12 are schematically indicated by the lengths of the recording marks. When data are to be recorded using a laser beam, since the laser beam is projected onto the optical recording medium 1 while it is being rotated, each of the recording marks M has an elliptic shape whose length corresponds to the time period during which a laser beam is projected onto the optical recording medium 1.

Therefore, when data are to be recorded in the optical recording medium 1 in a multilevel manner, the degrees of decomposition and degradation (change in light transmittances) of the record marks Ma to Mg are determined so that the light reflection coefficients of the record marks Ma to Mg when a laser beam is projected onto the virtual recording cells S for reproducing data vary among seven stages (eight stages if an unrecorded region is counted), for example. In this case, the light reflection coefficient of the record mark increases as the degree of decomposition and degradation of the recording layer 12 is lower. As a result, the virtual recording cell S to which no recording mark M is assigned has the highest light reflection characteristic and the virtual recording cell S to which the smallest recording mark Ma is assigned has the highest light reflection characteristic among the virtual recording cells S to which the recording marks M are assigned. Further, the light reflection coefficients of the virtual recording cells S to which the recording marks Mb to Mf decreases from the virtual recording cell S to which the recording mark Mb is assigned toward the virtual recording cell S to which the recording mark Mf is assigned and the virtual recording cell S to which the largest recording mark Mg is assigned has the lowest light reflection characteristic. Therefore, it is possible to form the recording marks Ma to Mg whose light reflection coefficients vary among seven stages by controlling the amount of a laser beam projected onto the recording layer 12 to appropriately determine decomposed and degraded areas of the recording layer 12, namely the light transmittances of the recording layer 12.

Next, the characteristics of the organic dye used for the recording layer 12 of the optical recording medium 1 will be described below with reference to the drawings.

The organic dye used for the recording layer 12 generally has such characteristics that the degree of decomposition and degradation thereof increases as the projection time of a laser beam (the amount of the laser beam projected thereonto) increases. On the other hand, the light reflection coefficient of the organic dye does not linearly change with respect to the projection time of the laser beam (the amount of the laser beam projected thereonto). Further, the decomposition and degradation of the organic dye caused by irradiation with the laser beam gradually progresses for a predetermined time period after the projection of the laser beam is started and, then, after the predetermined time period has passed, steeply and linearly progresses, whereafter it again progresses gradually until eventually substantially leveling off after a predetermined time period has passed.

Further, the light transmittance of the organic dye which is neither decomposed nor degraded, the light transmittance of the organic dye which has been most greatly decomposed and degraded (the light transmittance of the organic dye which has decomposed and degraded to such an extent that substantially no further decomposition and degradation occur even if the laser beam is further projected thereonto) and the change in the light transmittances of the organic dye in accordance with the degree of decomposition and degradation thereof depend upon the kind of the organic dye used for the recording layer 12. Therefore, if five kinds of optical recording media 1 are fabricated by forming recording layers 12 using different organic dyes, for example, the absolute light reflection coefficients of the recording layers 12 of the optical recording media 1 will be different from each other. Here, the "absolute light reflection coefficient" means the light reflection coefficient of an unrecorded region (unrecorded virtual recording cell) of an optical recording medium 1 in the case where the value of the light reflection coefficient of a disc fabricated by forming a thin film of Au or the like on a smooth surface thereof using a sputtering process, for example, is assumed to be 100%.

Figure 3:
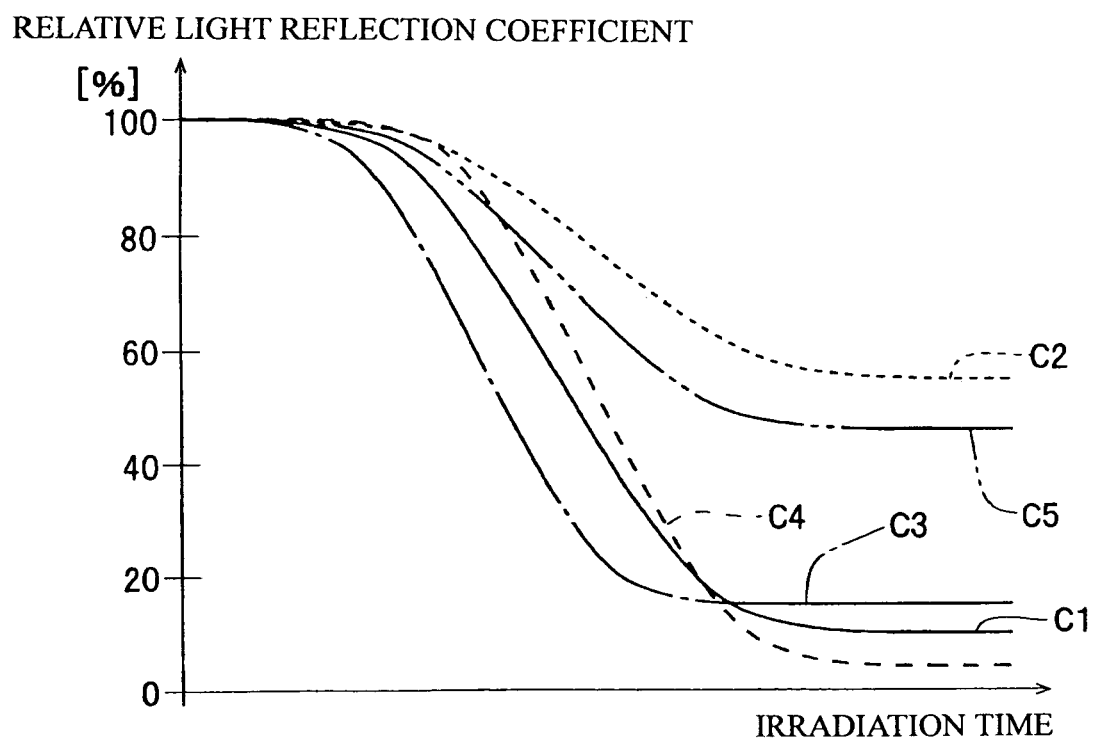
FIG. 3 is a graph showing relative light reflection coefficient characteristics of optical recording media 1 fabricated using various organic dyes.

FIG. 3 is a graph showing relative light reflection coefficient characteristics of optical recording media 1 fabricated using various organic dyes.

As indicated by characteristic curves C1 to C5 in FIG. 3, the relative light reflection coefficient characteristics of recording layers 12 of the optical recording media 1 are different from each other. As shown in FIG. 3, the gradients of the characteristic curves C1 to C5 are influenced by the degrees of decomposition and degradation of the organic dyes. Here, the "relative light reflection coefficient" means the light reflection coefficient of a recorded region, namely, a recorded virtual recording cell S of an optical recording medium 1, in the case where the value of the absolute light reflection coefficient of an unrecorded region, namely, an unrecorded virtual recording cell S of the optical recording medium 1, is assumed to be 100%.

Not only do, the absolute light reflection coefficient and the relative light reflection coefficient depend upon the kind of the organic dye as shown in FIG. 3, they further depend upon the thicknesses of the recording layers even in the case where the same organic dye is used.

Figure 4:
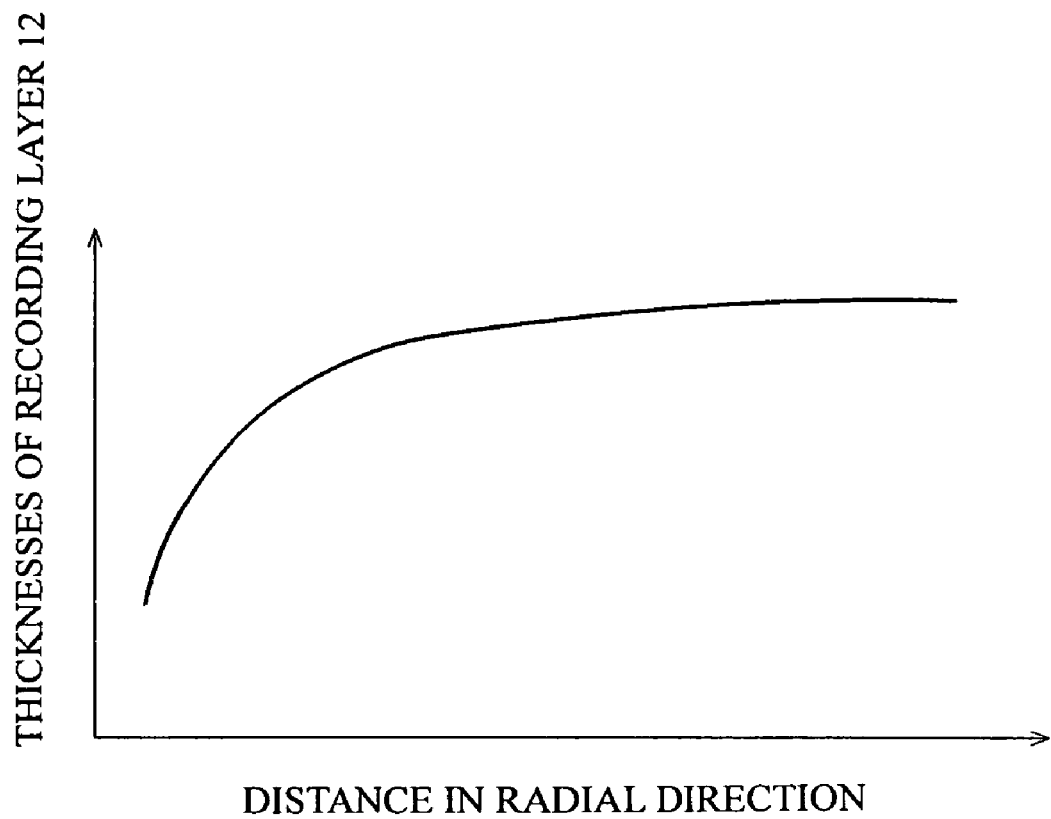
FIG. 4 is a graph schematically showing the relationship between the thickness of a recording layer 12 and distance in the diameter direction.

FIG. 4 is a graph schematically showing the relationship between the thickness of the recording layer 12 and distance in the diameter direction.

As shown in FIG. 4, the relationship between the thickness of the recording layer 12 and distance in the diameter direction can be approximately expressed by a logarithm function and the thickness of the recording layer 12 decreases sharply toward the inner portion of the optical recording medium 1. Such tendency inevitably occurs when the recording layer 12 is formed using a spin coating process. Therefore, even in the case where the same data are recorded in the same optical recording medium 1, the light reflection coefficient depends upon position in the diameter direction of the optical recording medium 1 and the light reflection coefficient greatly varies at an inner circumferential region of the optical recording medium 1. This causes variation in the light reflection coefficients of the recording layer 12 in the plane thereof.

Therefore, when data are to be reproduced from the optical recording medium 1, it is necessary for the optical data recording and reproducing apparatus to detect and correct for the variation in the light reflection coefficient of the recording layer 12 in the plane thereof and it is therefore necessary to store a plurality of reference signals in the optical recording medium 1. The reference signals are stored in the optical recording medium 1 in the same way that user data are recorded therein by using the virtual recording cells S. Specifically, the reference signals are constituted by virtual recording cells S in which predetermined recording marks are formed and/or unrecorded virtual recording cells S. The reference signals are used for detecting the variation in the light reflection coefficient of the recording layer 12 in the plane thereof with change in the recording position. For example, in the case where a reference signal is constituted by a virtual recording cell S to which the largest recording mark Mg is assigned, the optical data recording and reproducing apparatus again defines the reflection coefficient of the reference signal as the reflection coefficient of the virtual recording cell S to which the recording mark Mg at the recording position is assigned and reads data based on the thus defined reflection coefficient of the virtual recording cell S. In this specification, these reference signals are referred to as "calibration signals".

Next, a method for defining the light reflection coefficient using the calibration signals will be concretely described below.

Figure 5:
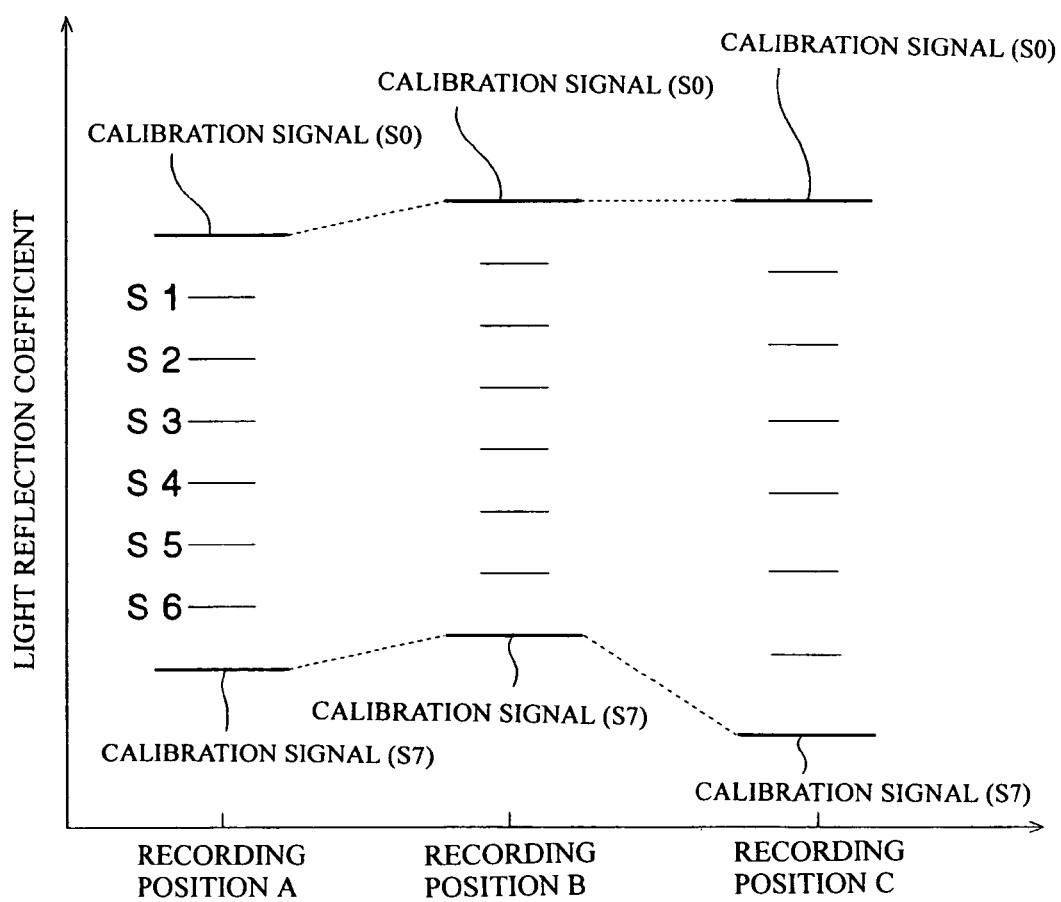
FIG. 5 is a diagram schematically showing a method for defining a light reflection coefficient using calibration signals.

FIG. 5 is a diagram schematically showing a method for defining the light reflection coefficient using the calibration signals.

In FIG. 5, the calibration signals are constituted by the virtual recording cell S7 to which the recording mark Mg is assigned and an unrecorded virtual recording cell S0 and the calibration signals are stored in recording positions A, B and C. In this case, the light reflection coefficient of the virtual recording cell S7 to which the recording mark Mg is assigned and the light reflection coefficient of the unrecorded virtual recording cell S0 are defined by the calibration signals read from the recording position A and the light reflection coefficients of the virtual recording cells S1 to S6 to which recording marks Ma to Mf are assigned are defined by dividing the difference between light reflection coefficient of the virtual recording cell S7 to which the recording mark Mg is assigned and the light reflection coefficient of the unrecorded virtual recording cell S0 into seven evenly spaced values. As a result, at a region between the recording position A and the recording position B, the content of data assigned to each of the virtual recording cells S is judged by referring to the above defined light reflection coefficients. For example, in the case where the light reflection coefficient obtained from a certain virtual recording cell S is defined by the calibration signals as a light reflection coefficient of a virtual recording cell S to which the recording mark Md is assigned, the optical data recording and reproducing apparatus judges that the recording mark Md is assigned to the virtual recording cell S.

Such calibration signals are also stored at the recording position B and at a region between the recording position B and the recording position C, the content of data assigned to each of the virtual recording cells S is judged based on the definition made by the calibration signals and stored at the recording position B.

Thus, the correction is made using the calibration signals, thereby canceling the influence of the variation in the light reflection coefficients of the recording layer 12 in the plane thereof caused by forming the recording layer 12 of the organic dye using a spin coating process.

The calibration signals are not particularly limited regarding concrete content but, as illustrated referring to in FIG. 5, it is preferable to constitute the calibration signals by a virtual recording cell S whose light reflection coefficient is lowest and a virtual recording cell S whose light reflection coefficient is highest. In this case, since the length of each of the virtual recording cells S along the grooves 11a is determined to be shorter than the diameter D of the condensed beam (diameter of the beam waist), the light reflection coefficient of each of the virtual recording cells S is influenced by neighboring virtual recording cells S. Therefore, in order to suppress the influence of the neighboring virtual recording cells S, it is preferable to constitute the calibration signals by a plurality of virtual recording cells S having the lowest light reflection coefficient and a plurality of virtual recording cells S having the highest light reflection coefficient.

Figure 6:
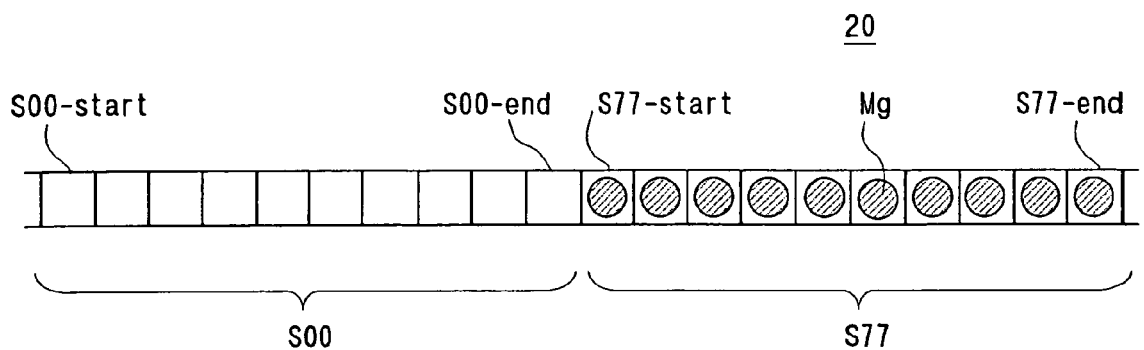
FIG. 6 is a diagram schematically showing a preferred example of a virtual recording cell train 20 constituting calibration signals.

FIG. 6 is a diagram schematically showing a preferred example of a virtual recording cell train 20 constituting calibration signals.

As shown in FIG. 6, the virtual recording cell sequence 20 constituting calibration signals consists of a virtual recording cell train S00 consisting of ten successive ten unrecorded virtual recording cells and a virtual recording cell train S77 consisting of ten successive ten virtual recording cells to which recording marks Mg are assigned. When light reflection coefficients are to be defined using such virtual recording cell train 20, a laser beam set to a reproducing power is projected onto the virtual recording cell train 20 and the light reflection coefficient of the cells included in the virtual recording cell train S00 and the light reflection coefficient of the cells included in the virtual recording cell train S77 are measured. Then, the light reflection coefficient of an unrecorded virtual recording cell S is defined based on the light reflection coefficient of the cells included in the virtual recording cell train S00 and the light reflection coefficient of a virtual recording cell S to which the recording mark Mg is assigned is defined based on the light reflection coefficient of the cells included in the virtual recording cell train S77. Further, the light reflection coefficients of virtual recording cells S to which recording marks Ma to Mf are defined by dividing the difference between light reflection coefficient of the virtual recording cell S to which the recording mark Mg is assigned and the light reflection coefficient of the unrecorded virtual recording cell S into seven equally spaced values.

In this case, when the light reflection coefficient of the unrecorded virtual recording cell S is to be defined, absolute light reflection coefficients obtained from virtual recording cells S other than the first virtual recording cell S00-start and the last virtual recording cell S00-end among the virtual recording cells S included in the virtual recording cell train S00 are used and when the light reflection coefficient of the virtual recording cell S to which the recording mark Mg is assigned is to be defined, absolute light reflection coefficients obtained from virtual recording cells S other than the first virtual recording cell S77-start and the last virtual recording cell S77-end among the virtual recording cells S included in the virtual recording cell train S77 are used. As a result, variation in light reflection coefficients caused by the influence of the neighboring virtual recording cells S can be eliminated.

Here, it is sufficient to store the calibration signals for each predetermined interval, for example, for each 10 KB to 100 KB of user data or each 10,000 to 100,000 virtual recording cells S. However, storing the calibration signals at high density has the effect of improving data reading accuracy at the expense of considerably reducing the area usable by the user, while storing the calibration signals at low density has the effect of minimizing the reduction of the area usable by the user at the expense of lowering the data reading accuracy. Therefore, it is preferable to determine the storage density of the calibration signals in accordance with the required data reading accuracy and required data storage capacity.

In particular, it is preferable to vary the density of the calibration signals stored in the optical recording medium 1 in accordance with the magnitude of the variation in the light reflection coefficient of the recording layer 12 in the plane thereof. Concretely, as mentioned referring to FIG. 4, since the variation in thickness of the recording layer 12 becomes large toward the inner circumferential portion thereof, it is preferable to determine the storage density of the calibration signals larger at regions closer to the inner circumferential portion of the recording layer 12 and smaller at regions closer to the outer circumferential portion thereof. If the calibration signals are stored in this manner, accuracy of reading data can be improved and the area usable by the user can be increased in comparison with the case where the calibration signals are stored at uniform intervals. In this case, the storage density of the calibration signals may be continuously increased with increasing proximity to the inner circumferential portion of the recording layer 12 or may be stepwise increased with increasing proximity to the inner circumferential portion of the recording layer 12.

Next, an optical data recording and reproducing apparatus 40 for recording data in the optical recording medium 1 and reproducing data from the optical recording medium 1 will be described below.

Figure 7:
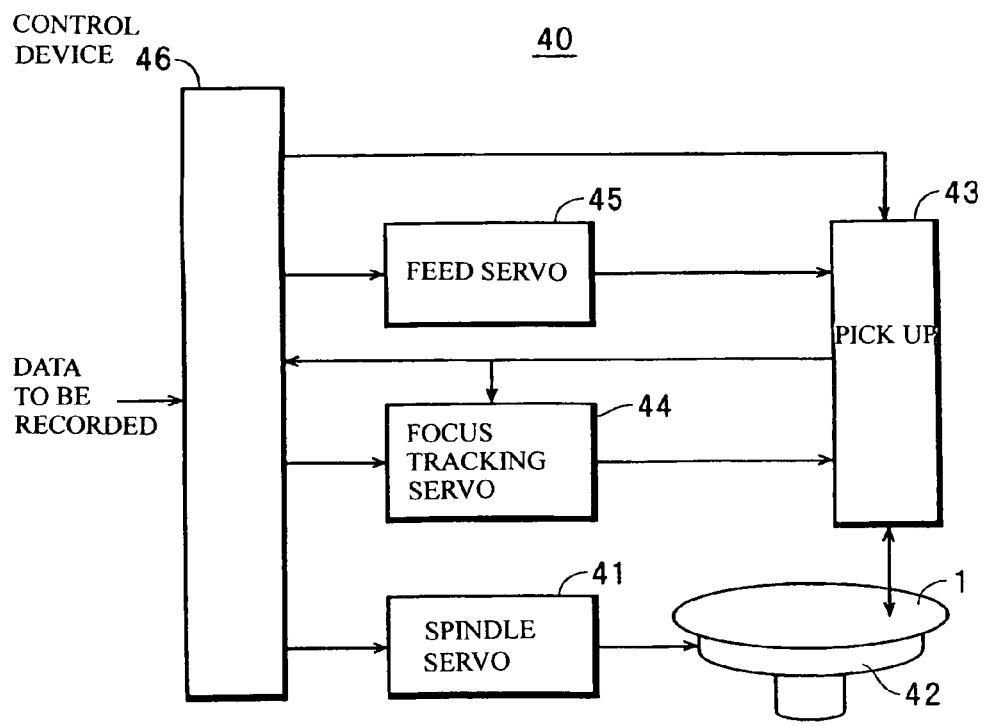
FIG. 7 is a block diagram schematically showing the structure of an optical data recording and reproducing apparatus 40.

FIG. 7 is a block diagram schematically showing the structure of the optical data recording and reproducing apparatus 40.

As shown in FIG. 7, the optical data recording and reproducing apparatus 40 is constituted as a CD-R recorder and includes a spindle servo 41, a spindle motor 42, a pick up 43, a focus tracking servo 44, a feed servo 45 and a control device 46. The spindle motor 42 is driven and controlled by the spindle servo 41 so as to rotate the optical recording medium 1 at a constant linear velocity. The pick up 43 projects a laser beam which is emitted from a laser beam source (not shown) driven by a laser driver (not shown) under the control of the control device 46 and whose power is set to a recording power or a reproducing power onto the optical recording medium 1. As a result, recording marks M are recorded in virtual recording cells S and electric signals whose intensities correspond to the levels of the laser beam reflected from the virtual recording cells S are output. In this case, when data are to be recorded, the laser driver of the pick up 43 is controlled by the control device 46 so as to adjust the amount of the laser beam projected onto a virtual recording cell S, such as by controlling the number of pulses of the laser beam and/or the power of the laser beam or the height of pulses of the laser beam in accordance with the content of data to be recorded. Instead of adjusting the amount of the laser beam by the laser driver, the amount of the laser beam can be adjusted by disposing a light modulator in the optical path of the laser beam and driving and controlling the light modulator using the control device 46. As described above, when data are recorded, the calibration signals are stored in the optical recording medium 1 at predetermined density.

The pick up 43 further includes an objective lens (not shown) and a half mirror (not shown) and condenses the laser beam set to the recording power or the reproducing power onto the recording layer 12 of the optical recording medium 1. Concretely, the objective lens is focus tracking controlled by the focus tracking servo 44, thereby condensing the laser beam set to the recording power or the reproducing power onto the recording layer 12 of the optical recording medium 1. The pick up 43 is reciprocated by the feed servo 45 between the inner circumferential portion and the outer circumferential portion of the optical recording medium 1 along the diameter direction thereof. The control device 46 controls the operations of the spindle servo 41, the pick up 43, the focus tracking servo 44 and the feed servo 45 and reads data recorded in the recording layer 12 based on electrical signals output from the pick up 43 and the corresponding calibration signals.

As described above, according to this embodiment, since the calibration signals are stored in the optical recording medium 1 at predetermined density, it is possible to cancel the influence of the variation in the light reflection coefficient of the recording layer 12 in the plane thereof caused by forming the recording layer 12 of an organic dye using a spin coating process. In particular, if the storage density of the calibration signals is determined so as to increase with increasing proximity to the inner circumferential portion of the optical recording medium 1 and decrease with increasing proximity to the outer circumferential portion of the optical recording medium 1, it is possible to simultaneously improve data reading accuracy data and increase the area usable by the user.

The present invention is in no way limited to the aforementioned embodiments, but rather various modifications are possible within the scope of the invention as recited in the claims, and these are naturally included within the scope of the invention.

For example, in the above described embodiment, although the virtual recording cell train S00 consisting of ten successive unrecorded virtual recording cells and the virtual recording cell train S77 consisting of ten successive virtual recording cells to which recording marks Mg are assigned are used as the virtual recording cell train 20 constituting calibration signals, the number of the virtual recording cells constituting the unrecorded virtual recording cell train S00 and the number of the virtual recording cells constituting the virtual recording cell train S77 to which recording marks Mg are assigned are not limited to ten and may be arbitrarily determined. However, as mentioned above, since the first virtual recording cells S00-start and S77-start and the last virtual recording cells S00-end and S77-end are not suitable for use as calibration signals, the number of the virtual recording cells constituting the virtual recording cell train S00 and the number of the virtual recording cells constituting the virtual recording cell train S77 have to be equal to or larger than three. On the other hand, in the case where the number of the virtual recording cells constituting the virtual recording cell train S00 and the number of the virtual recording cells constituting the virtual recording cell train S77 are too large, the number of virtual recording cells usable for recording information becomes small. It is therefore preferable to determine the number of the virtual recording cells constituting each of the virtual recording cell train S00 and the virtual recording cell train S77 to be equal to or smaller than 50. Further, it is not absolutely necessary for the number of the virtual recording cells constituting the virtual recording cell train S00 and the number of the virtual recording cells constituting the virtual recording cell train S77 to be the same and they may be different from each other.

Further, in the above described embodiment, although the virtual recording cell train 20 constituting calibration signals is constituted by the unrecorded virtual recording cell train S00 and the virtual recording cell train S77 to which recording marks Mg are assigned, it is not absolutely necessary to constitute the calibration signals by the unrecorded virtual recording cell train S00 and the virtual recording cell train S77 to which recording marks Mg are assigned and the calibration signals may be constituted by another combination of a plurality of virtual recording cell trains. For example, the calibration signals may be constituted by the unrecorded virtual recording cell train S00 and a virtual recording cell train S44 to which recording marks Md are assigned or may be constituted by a virtual recording cell train S11 to which recording marks Ma are assigned and a virtual recording cell train S66 to which recording marks Mf are assigned.

Furthermore, in the above described embodiment, although the virtual recording cell train S00 and the virtual recording cell train S77 are continuously formed, another virtual recording cell train may be interposed therebetween.

Moreover, in the above described embodiment, although the optical recording medium 1 is constituted so that a laser beam is projected thereonto from the side of the substrate 11 when data are to be recorded and when data are to be reproduced, the present invention can be applied to an optical recording medium 1 constituted by sequentially forming a reflective layer, a recording layer and a light transmittable protective layer in this order so that a laser beam is projected thereonto from the side of the light transmittable protective layer.

Further, in the above described embodiment, although three bits of information are stored in one virtual recording cell S by forming recording marks Ma to Mg in which the degrees of decomposition and degradation are different from each other among seven stages in the virtual recording cells S, the number of stages the recording marks is not limited to seven and recording marks in which the degrees of decomposition and degradation are different from each other among an arbitrary number of stages may be formed insofar as one or more bits of information can be recorded in one virtual recording cell S.

Furthermore, in the above described embodiment, although the explanation was made as to the case where the present invention was applied to the CD-R type optical recording medium 1 (write-once type optical recording medium 1), as mentioned above the present invention can be applied to a CD-RW type optical recording medium (data rewritable type optical recording medium) in which a phase change material is used for a recording layer. In this case, since the recording layer is formed using a sputtering process, it is possible according to the present invention to cancel the influence of the variation in thickness of the recording layer in the plane thereof caused by the structure of a sputtering device, the influence of sputtering target consumption (erosion) as the sputtering process progresses, and the like.

As described above, since the calibration signals are stored in the optical recording medium 1 according to the present invention at predetermined density, it is possible to cancel the influence of the variation in thickness of the recording layer in the plane thereof caused by various factors.

The invention claimed is:

1. An optical recording medium which comprises at least a recording layer and in which data can be recorded in a multilevel manner by controlling state of the recording layer among multiple stages, the recording layer storing a plurality of calibration signals along a recording track, each of the plurality of calibration signals including at least a first virtual recording cell sequence in which plurality of virtual recording cells each having a highest reflection coefficient are sequentially formed and a second virtual recording cell sequence in which a plurality of virtual recording cells each having a lowest reflection coefficient are sequentially formed.

2. The optical recording medium in accordance with claim 1, wherein the recording layer is formed of a dye.

3. The optical recording medium in accordance with claim 2, wherein the recording layer is formed using a spin coating process.

4. The optical recording medium in accordance with claim 3, wherein density of calibration signals stored at an inner circumferential portion is higher than that of calibration signals stored at an outer circumferential portion.

5. The optical recording medium in accordance with claim 1, wherein the recording layer is formed of a phase change material.

6. The optical recording medium in accordance with claim 5, wherein the recording layer is formed using a sputtering process.

* * * * *